Oct. 30, 1956 T. J. O'DONNELL 2,768,433
METALLIC BOND AND METHOD
Filed Feb. 1, 1944

Inventor:
Thomas J. O'Donnell
By: Robert A. [illegible]
Attorney.

2,768,433

METALLIC BOND AND METHOD

Thomas J. O'Donnell, Chicago, Ill., assignor to the United States of America as represented by the United States Atomic Energy Commission Application February 1, 1944, Serial No. 520,637

7 Claims. (Cl. 29—447)

My invention relates to methods of bonding one body within another, and more specifically, methods of bonding a sleeve member onto a telescopically fitting body member.

In the past, it has been customary to effect a shrink fit between metal bodies in telescopic relationship, for example, by making the internal diameter of an outer sleeve member smaller than the external diameter of an inner member (such as a rod), heating the external member until its diameter exceeds that of the inner member, then slipping the outer member into telescopic relationship with the inner member and allowing it to cool and contract into tight gripping (shrink fitting) relationship with the inner member. However, this practice has a distinct disadvantage where employed with an outer member that is relatively thin and of low heat retaining capacity for the reason that when such an outer member is heated and brought into contact with the cold inner member, the latter rapidly absorbs the heat from the outer member causing it to cool and contract before it can be moved lengthwise of the inner member to the desired position thereon.

An object of my invention is to provide a method of bonding a sleeve member onto an inner member without the danger of being unable to slide the sleeve member telescopically in place before gripping or bonding occurs.

Another object of my invention is to provide two metal bodies in telescopic relationship that have a tight fitting bond therebetween.

These and other objects will become more apparent from the following description and claims taken together with the drawing, in which:

Figure 1:
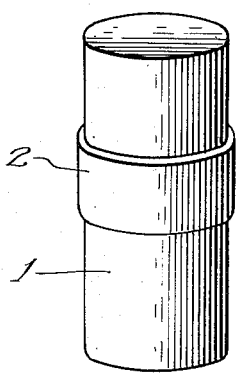
Fig. 1 is a perspective view of a sleeve member loosely fitting in telescopic relationship with a rod member.
Figure 2:
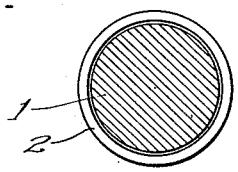
Fig. 2 is a cross-sectional view taken transversely of the structure shown in Fig. 1.

Referring more particularly to Figs. 1 and 2, numeral 1 denotes an inner or rod member of any suitable metal, alloy or compound, such as, for example, uranium, and numeral 2 denotes a cylindrical sleeve or outer member of any suitable metal, alloy or compound, such as, for example, aluminum. The sleeve 2 is constructed to fit loosely over the inner member 1 at normal (room) temperatures so that said sleeve member can be readily slipped over the inner member and slid telescopically into the desired place thereon when both members are cold (that is, at room temperature), as indicated by the loose fitting shown in Fig. 2.

Figure 3:
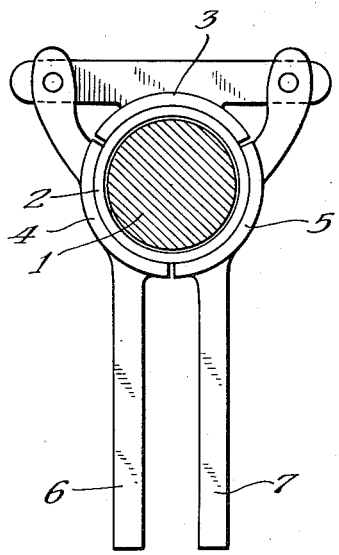
Fig. 3 is a plan view of a clamp member as used in carrying out the method of bonding the sleeve member onto the rod member.

The inner member 1 with the outer sleeve 2 in place is then placed in a hot clamp, for example, of the type shown in Fig. 3 made up of a plurality of segments of a cylinder 3, 4, and 5, the two segments 4 and 5 being movable by handles 6 and 7. When closed, the clamp fits tightly over the outer sleeve 2.

Before using, the clamp is heated electrically or by other means (not shown) to a temperature sufficiently high to render the material of the sleeve relatively plastic and readily subject to plastic deformation. Such temperature depends, of course, upon the particular sleeve material employed and its thickness.

When the clamp is closed upon the sleeve, the latter is heated by conduction and tends to expand radially and longitudinally, but, being held tightly in the clamp, it is unable to expand radially and retains its original outer diameter and is thus subjected to plastic deformation. After the lapse of one or more seconds, depending on the thickness of the sleeve, the clamp is opened by means of the handles 6 and 7. The heated sleeve then cools and shrinks onto the surface of the inner member, which has remained relatively cold, thereby producing a tight bond or fit between outer and inner members.

A modification of the above method is that of applying not only heat but pressure to the sleeve, by means of the heated clamp, so that plastic deformation of the sleeve takes place aided by the contracting force exerted thereon by the clamp, thus causing the sleeve to move into very close contact with the inner member while still hot, so that upon cooling it will shrink into tight engagement with the rod.

While an aluminum sleeve and a uranium rod have been described above as examples, it should be especially noted that the invention is not confined to these materials but may be applied to a great number of combinations of metal, alloys or compounds. Aluminum has no definite elastic limit. With metals having a definite elastic limit, the clamp will apply a pressure so as to exceed such elastic limit and obtain permanent deformation. Further, it should be noted that the members need not be as shown but may be two cylindrical sleeve members, or non-cylindrical telescopically fitting members (such as square-shaped sleeves, etc.), or in fact, any other shapes of interfitting members.

It will be understood, therefore, that the above specification shows and describes but one embodiment of the invention and that various other modifications may be made from the teachings of the present invention within the scope of the appended claims.

I claim:

1. The method of forming a bond between two telescoped metal members of which the outer member has an inner diameter greater than the outer diameter of the inner member comprising the steps of rapidly heating the external member to a temperature sufficiently high to allow plastic flow of the metal, restraining said external member from transverse expansion during the heating step whereby said external member is deformed inwardly by plastic flow of the metal due to non-uniform expansion, and then promptly cooling said external member to prevent substantial heating of the interior member whereby transverse shrinkage of the external member occurs and said members are firmly bonded together as a result of said shrinkage.

2. The method of forming a bond between an outer tubular member of plastic metal and an inner member initially disposed inside the outer member comprising the steps of rapidly heating the tubular member to a temperature at which it becomes plastic, simultaneously clamping the tubular member about its external surface with sufficient force to prevent transverse expansion of said tubular member during heating and thereby deforming said tubular member by non-uniform expansion, and thereafter promptly cooling said tubular member to prevent substantial heating of the inner member to form a bond by shrinkage of the tubular member about said internal member.

3. The method of fastening an exterior metal member to a slidably fitting internal metal member comprising telescoping said members at normal room temperatures, rapidly heating the exterior member sufficiently to allow plastic flow of the metal and simultaneously straining by compressive force the exterior member beyond its elastic limit in directions toward the internal member to develop a permanent deformation of said external member due to non-uniform expansion, and thereafter promptly cooling said external member to prevent substantial heating of the inner member to cause contraction of the external member about said internal member.

4. The method of forming a tight bond between a thin metal tube and an elongated metal body comprising the steps of telescoping said tube over said body while cold, rapidly heating the tube sufficiently to allow plastic flow of the metal and allowing expansion of said tube longitudinally while confining said tube from radially outward expansion thereby maintaining the external diameter of said tube substantially constant thereby straining said tube in a radially inward direction beyond the elastic limit of the tube metal, and then promptly cooling the tube to prevent substantial heating of the inner member to cause contraction of the tube about said metal body.

5. The method of affixing a relatively thin cylindrical metal member to an internal metal member comprising the steps of assembling the members in loose telescopic engagement while cold, clamping the cylindrical member with sufficient force to close contacting relationship with the internal member while simultaneously rapidly heating the cylindrical member sufficiently to allow plastic flow of the metal, due to non-uniform expansion and following clamping, promptly cooling said cylindrical member to prevent substantial heating of the internal member to cause said cylindrical member to shrink about said internal member.

6. The method of affixing a relatively thin cylindrical metal outer member to an internal metal member wherein the inner diameter of the outer member is greater than the outer diameter of the inner member comprising the steps of placing the outer member over the inner member at the position ultimately desired, clamping the cylindrical member with sufficient force to prevent transverse expansion of the outer member as the result of heating, and then while so clamping and restraining the outer member due to non-uniform expansion applying heat to the outer member rapidly sufficient to cause plastic deformation of the outer member and then promptly cooling said outer member to prevent substantial heating of the inner member to cause it to shrink about and tightly grip the inner member.

7. The method of forming a tight bond between a relatively thin aluminum tube and a uranium body comprising the steps of telescoping said tube over said body while cold, rapidly heating said tube while simultaneously restraining said tube from expansion radially outwardly as the result of heating so as to effect plastic deformation thereof due to non-uniform expansion, and thereafter promptly cooling said tube to prevent substantial heating of the body and to cause said tube to grip said body tightly.

References Cited in the file of this patent

UNITED STATES PATENTS

| | | |
|---|---|---|
| 1,346,535 | Fedden | July 13, 1920 |
| 1,597,189 | Gero | Aug. 24, 1926 |
| 1,920,791 | Hogan | Aug. 1, 1933 |
| 1,975,422 | Hellenbroich | Oct. 2, 1934 |